UNITED STATES PATENT OFFICE.

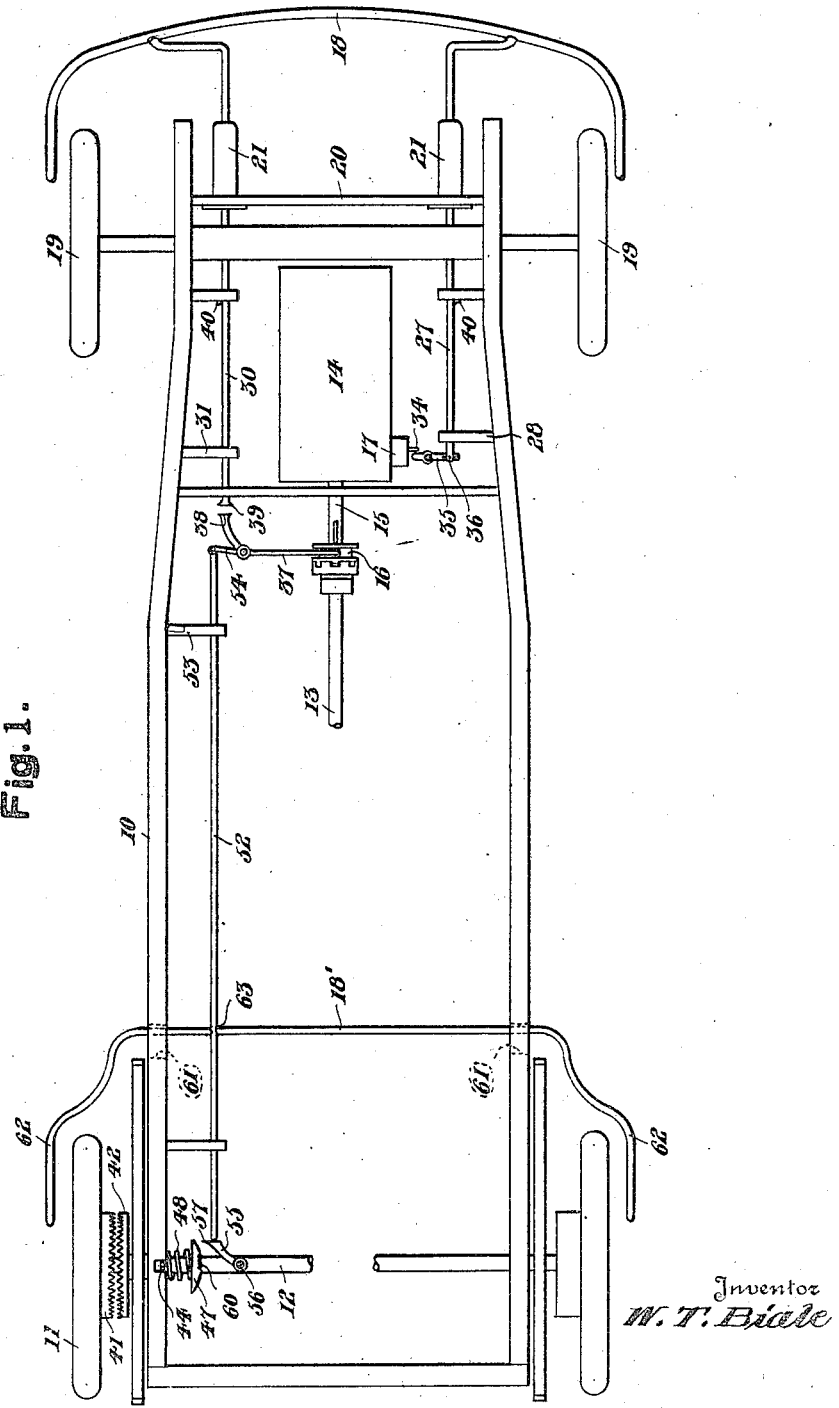

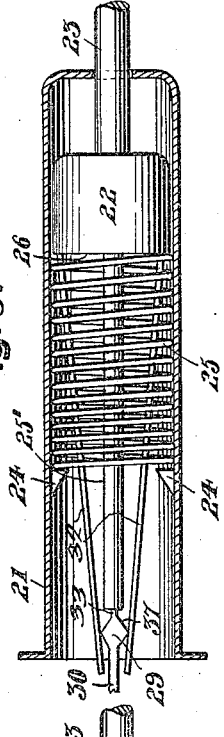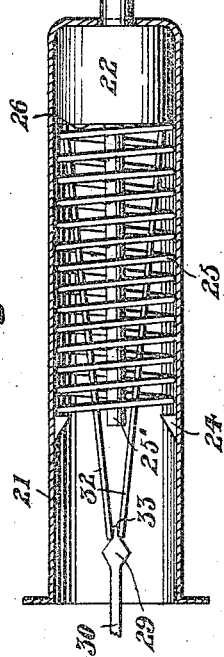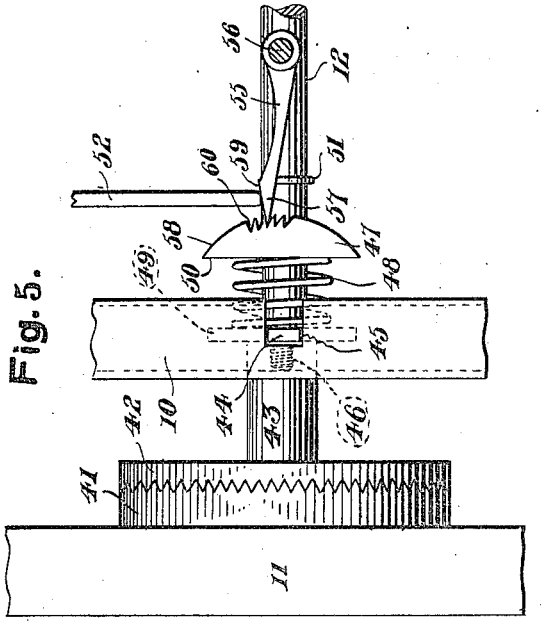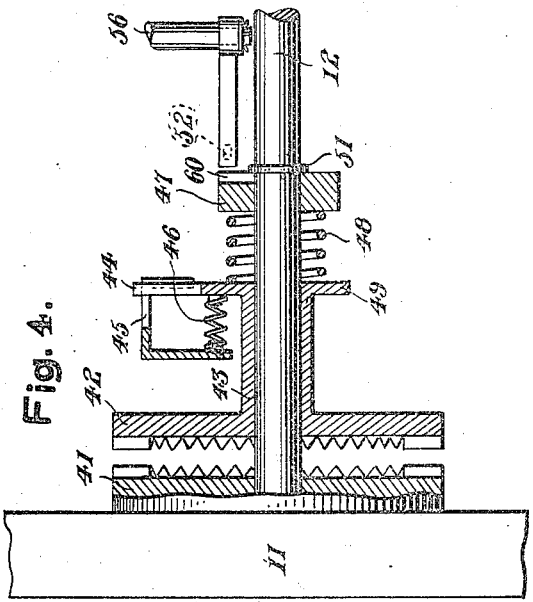

WLADYSLAW T. BIALE, OF DETROIT, MICHIGAN.

BUFFER-OPERATED VEHICLE-BRAKE.

1,176,195.   Specification of Letters Patent.   Patented Mar. 21, 1916.

Application filed October 12, 1915.   Serial No. 55,430.

*To all whom it may concern:*

Be it known that I, WLADYSLAW T. BIALE, a subject of the Emperor of Austria-Hungary, residing at Detroit, in the county of Wayne and State of Michigan, have invented certain new and useful Improvements in Buffer-Operated Vehicle-Brakes, of which the following is a specification.

This invention relates to certain new and useful improvements in buffer-operated vehicle brakes.

The primary object of the invention is the provision of a vehicle brake automatically operable for stopping a vehicle upon the contacting of any object by the vehicle buffer.

A further object is to provide buffer-actuated means upon a vehicle whereby the motor and magneto are automatically thrown out of operation and the driving wheels are locked against rotation in the event of the buffer coming in violent contact with any object such as in the event of an accident.

A still further object is to provide an automatic emergency appliance for automobiles adapted for preventing and reducing the severity of accidents by automatically stopping the vehicle at any time upon striking an object.

It will be understood that while the invention is primarily designed for automobiles including electric vehicles, the mechanism is also adaptable for street cars and all other vehicles in which a buffer or fender is ordinarily serviceable.

With these general objects in view and others that will appear as the nature of the invention is better understood, the same consists in the novel construction, combination and arrangement of parts hereinafter more fully described, illustrated in the accompanying drawings, and then claimed.

In the drawings forming a part of this application and in which like designating characters refer to corresponding parts throughout the several views: Figure 1 is a top plan view of a chassis provided with the present device and with parts removed and broken away. Figs. 2 and 3 are central longitudinal sectional views through one of the buffer-mounting cylinders and illustrating the automatic operating mechanism in its set and its tripped positions, respectively. Fig. 4 is an enlarged vertical detail view of the wheel locking device in its released position, the adjacent parts being shown in elevation, and, Fig. 5 is a top plan view thereof in its locked position.

Referring more in detail to the accompanying drawings, the invention is herein illustrated as provided upon an automobile having the usual main frame 10 and rear traction wheels 11, the power axles 12 being provided in the usual manner for the said rear drive wheels 11 and operable by the driving shaft 13. The automobile is provided with any preferred form of motor 14 having its power shaft 15 adapted to be operatively connected with the driving shaft 13 by means of the shiftable clutch 16, the said motor being also provided with any form of magneto 17 in connection with the ignition system thereof.

A substantially semi-circular or curved buffer bar 18 is mounted upon the frame 10 forwardly thereof and in advance of the front wheels 19 of the automobile, the said bar being supported by a cross plate 20 at the forward end of the frame 10 by means of oppositely-positioned cylinders 21 within which the pistons 22 of angular rods 23 attached to the buffer bar 18 are longitudinally slidably mounted.

Lugs 24 are arranged within the cylinders 21 and expansion buffer springs 25 are arranged within the cylinders seated and slightly compressed between the lugs 24 and the adjacent or inner faces 26 of the said pistons 22.

A magneto actuating rod 27 is slidably mounted in brackets 28 at one side of the frame 10 and has its inner end provided with a head 29 arranged within the cylinder 21 at that side of the frame while a clutch actuating rod 30 is similarly slidably mounted in brackets 31 at the opposite side of the frame 10 and has an identically arranged head positioned within the cylinder 21 upon that side of the said frame. It will be understood that both of the cylinders 21 and all the functional elements therein contained are identical whereby the simultaneous operation of the two slide rods 27 and 30 is automatically effected. The pistons 22 are each provided with rearwardly projecting resilient arms 32 converging rearwardly and normally positioned resting upon the adjacent rod head 29 and slightly spaced apart with a projection or tip 33 of the head arranged therebetween as illustrated in Fig. 2 of the drawings.

The magneto 17 is provided with a shut-off lever or switch 34 actuated by the pivoted lever 35 which is operatively connected by a shiftable pivot connection 36 with the inner end of the magneto operating rod 27. The motor clutch 16 is provided with a pivoted clutch lever 37 having its free end 38 normally positioned in alinement with and slightly spaced from the rear end 39 of the operating rod 30.

From this detailed description of the above mechanism it will be readily apparent that in the event that the automobile comes in violent contact with any object by striking the same with the buffer rod 18, the pistons 22 will be forced inwardly of the cylinder 21, thus compressing the buffer springs 25, and forcing the rear ends of the piston arms 32 against the adjacent conical faces 37 of the operating rod head 29 and thus forcing the rods 27 and 30 rearwardly, and which movement of the arms 32 after giving the sudden impulse to the heads 29, allows the arms to separate sufficiently to slide over the said heads to the position illustrated in Fig. 3. Such violent rearward impulse of the rod 27 automatically trips the magneto switch 34 and cuts out the magneto of the motor 14 while the simultaneous movement of the rod 30 engages its rear end 39 with the clutch lever end 38 and operates the clutch 16, whereby the motor 14 is disconnected from the driving shaft 13 of the vehicle. Upon a release of the pressure upon the buffer bar 18, the expansion springs 25 normally return the said bar to its forward operative position and also draws forwardly the operating rods 27 and 30, the forward movements thereof being limited by stops 40 carried by the said rods, thus stopping the said rods with the heads 29 positioned as illustrated in Fig. 2. A post 25' is carried by each of the pistons 22 which is adapted to forcibly engage the rod fingers 33 for insuring the actuation of the rod 30.

An automatically actuated locking device for either one or both of the rear wheels 11 is provided herein shown as operatively positioned in connection with one driving wheel thereof in Fig. 1 of the drawings, the same consisting broadly of a toothed clutch disk 41 carried by the inner face of the drive wheel 11 and preferably rigidly mounted upon the adjacent portion of the rear axle 12 outwardly of the vehicle frame 10. A similar clutch disk 42 is provided upon a sleeve 43 shiftably arranged upon the rear axle portion 12 and adapted for clutching engagement with the said wheel carried disk 41, the said sleeve 43 having an upwardly-extending finger 44 slidably mounted within an inwardly opening slot 45 of the vehicle frame 10 and whereby the sleeve 43 is prevented from revolving with the axle 12 although permitted to slide longitudinally thereof, a cushioning spring 46 being arranged between the adjacent face of the frame 10 and the finger 44.

A cam disk 47 substantially semi-circular in cross-section is slidably mounted upon the axle 12 being prevented from rotating therewith by means of an expansion spring 48 connecting the inner end or flange 49 of the collar 43 with the adjacent face 50 of the said cam while a stop ring 51 is carried by the axle 12 for limiting the inward movement of the cam 47.

A brake rod 52 is slidably mounted in brackets 53 upon one side of the frame 10 and has its forward end pivotally connected to the free end of a finger 54 of the clutch lever 37 and whereby it will be evident that upon a rearward movement of the operating rod 30, which results in moving the lever 37 to disconnect the clutch 16, the finger 54 will forcibly move the said brake rod 52 rearwardly. An operating foot 55 is secured to a depending rod 56 carried by any desired portion of the automobile body and having a tapered toe 57 adapted to operatively engage the adjacent curved face 58 of the cam disk 47 and move the same transversely toward the adjacent wheel 11. The rear end of the rod 52 operatively engages the adjacent surface 59 of the toe 57 removing the same over the cam face 58 which results in laterally shifting the sleeve 43 and engaging the locking disks 41 and 42 together, the toe 57 then engaging the notched surface 60 of the cam disk 47 and retaining the foot in its engagement with the disk and the locking members 41 and 42 resiliently in engagement with each other, thus restraining the wheel 11 and axle 12 against rotation.

From this detailed description of the device, it will be seen that any inward impulse upon the buffer 18 not only cuts out the motor magneto 17 and disconnects the motor clutch 16 by means of the operating levers 27 and 30 respectively, and in the manner hereinbefore specifically described, but such operation also through the agency of the brake rod 52 firmly locks one or both of the rear drive wheels 11 against rotation and thus brings the vehicle to a sudden stop. A device is thus provided for all manner of vehicles which is easy and inexpensive to install and whereby accidents will be positively prevented. It will be also noted that a rear buffer bar 18' is positioned transversely of the frame 10 and slidably mounted within slots 61 through opposite sides of the frame 10 and having laterally projecting curved buffer ends 62 arranged forwardly of the rear wheels 11, it being seen that the said bar 18' is rigidly secured to the brake rod 52 as at 63. Any contacting of the rear buffer rod 62 by an obstructing object forces the brake rod 52 rearwardly, thus locking the rear wheels 11 in a manner heretofore described while the said operation also exerts a rearward pull upon the finger 54 of the clutch lever 37 and effects an automatic disconnecting of the clutch 16 of the motor 14.

While the form of the invention herein shown and described is what is believed to be the preferred embodiment thereof, it is nevertheless to be understood that various forms, modifications and arrangements of the parts may be made without departing from the spirit and scope of the invention as claimed.

What I claim as new is:—

1. A device of the class described, comprising in combination with a vehicle having a frame, opposite mounting cylinders carried by the said frame, normally projected resiliently mounted pistons within the said cylinders, a forwardly arranged buffer attached to the said pistons, a longitudinally slidable clutch operating rod mounted at one side of the said frame and having a substantially conical head projecting within the adjacent one of the said cylinders, rearwardly convergent resilient operating arms carried by the piston of the said last-named cylinder in normal operative engagement with the said rod head, a motor for the said vehicle, a clutch for the said motor, and a clutch lever for the said clutch being operatively positioned in the path of movement of the said rod during the inward actuation of the said pistons.

2. A device of the class described, comprising in combination with a vehicle having a frame, opposite mounting cylinders carried by the said frame, normally projected resiliently mounted pistons within the said cylinders, a forwardly arranged buffer attached to the said pistons, a longitudinally slidable clutch operating rod mounted at one side of the said frame and having a substantially conical head projecting within the adjacent one of the said cylinders, rearwardly convergent resilient operating arms carried by the piston of the said last-named cylinder in normal operative engagement with the said rod head, a motor for the said vehicle, a clutch for the said motor, a clutch lever for the said clutch being operatively positioned in the path of movement of the said rod during the inward actuation of the said pistons, a magneto for the said motor, a switch for the said magneto, a clutch operating rod operatively connected to the said switch and positioned in parallelism with and at the opposite side of the vehicle frame from the said clutch operating rod, and operative connections between the said magneto operating rod and the other one of said cylinder pistons.

3. A device of the class described, comprising in combination with a vehicle having a frame, opposite mounting cylinders carried by the said frame, normally projected resiliently mounted pistons within the said cylinders, a forwardly arranged buffer attached to the said pistons, a longitudinally slidable clutch operating rod mounted at one side of the said frame and having a substantially conical head projecting within the adjacent one of the said cylinders, rearwardly convergent resilient operating arms carried by the piston of the said last-named cylinder in normal operative engagement with the said rod head, a motor for the said vehicle, a clutch for the said motor, a clutch lever for the said clutch being operatively positioned in the path of movement of the said rod during the inward actuation of the said pistons, a locking brake for the rear wheels of the vehicle, a shiftable brake rod for the said locking brake mounted upon the said frame and upon the same side thereof as the said clutch operating rod, and a finger connection between the forward end of the said brake rod and the said clutch lever.

4. A device of the class described, comprising in combination with a vehicle having a frame, opposite mounting cylinders carried by the said frame, normally projected resiliently mounted pistons within the said cylinders, a forwardly arranged buffer attached to the said pistons, a longitudinally slidable clutch operating rod mounted at one side of the said frame and having a substantially conical head projecting within the adjacent one of the said cylinders, rearwardly convergent resilient operating arms carried by the piston of the said last-named cylinder in normal operative engagement with the said rod head, a motor for the said vehicle, a clutch for the said motor, a clutch lever for the said clutch being operatively positioned in the path of movement of the said rod during the inward actuation of the said pistons, a magneto for the said motor, a switch for the said magneto, a clutch operating rod operatively connected to the said switch and positioned in parallelism with and at the opposite side of the vehicle frame from the said clutch operating rod, operative connections between the said magneto operating rod and the other one of said cylinder pistons, a locking brake for the rear wheels of the vehicle, a shiftable brake rod for the said locking brake mounted upon the said frame and upon the same side thereof as the said clutch operating rod, and a finger connection between the forward end of the said brake rod and the said clutch lever.

5. A locking brake for a vehicle, comprising in combination with the wheel and axle thereof, a clutch disk rigidly carried by the said wheel and axle, a collar slidably mounted upon the said axle, a clutching disk carried by the said collar adjacent the first-named disk, an operating cam for the said collar slidably mounted upon the said axle and provided with a curved toothed surface, an actuating foot for the said cam disk, an operating rod positioned adjacent the said foot, and automatically operated buffer means connected to the said rod.

In testimony whereof I affix my signature.

WŁADYSŁAW T. BIALE.